(12) United States Patent
Van De Lande

(10) Patent No.: US 7,266,924 B2
(45) Date of Patent: Sep. 11, 2007

(54) METHOD AND APPARATUS FOR IRRIGATING PRODUCTS ON CULTIVATING TABLES

(75) Inventor: Theodorus G. A. Van De Lande, Raamsdonksveer (NL)

(73) Assignee: Van De Lande En Zonen B.V., Raamsdonksveer (NL)

( * ) Notice: Subject to any disclaimer, the term of this patent is extended or adjusted under 35 U.S.C. 154(b) by 71 days.

(21) Appl. No.: 10/818,945

(22) Filed: Apr. 6, 2004

(65) Prior Publication Data

US 2005/0217176 A1    Oct. 6, 2005

(51) Int. Cl.
*A01G 31/02* (2006.01)
(52) U.S. Cl. .......................................... 47/62 R; 47/63
(58) Field of Classification Search ............... 47/17, 47/62 A, 62 C, 62 E, 62 N, 62 R, 63; 108/5, 108/61, 64, 65, 67, 89, 102, 137, 140, 153.1, 108/154
See application file for complete search history.

(56) References Cited

U.S. PATENT DOCUMENTS

| | | | | |
|---|---|---|---|---|
| 2,060,735 A | * | 11/1936 | Krueger | .................. 47/62 R |
| 4,222,373 A | * | 9/1980 | Davis | ......................... 126/664 |
| 4,603,506 A | * | 8/1986 | Powell, Jr. | ................... 47/62 E |
| 5,355,618 A | | 10/1994 | Pedersen | |
| 5,415,155 A | | 5/1995 | Cohen et al. | |
| 5,675,932 A | * | 10/1997 | Mauney | ...................... 47/62 R |
| 6,247,268 B1 | * | 6/2001 | Auer | .......................... 47/62 R |
| 2004/0025429 A1 | * | 2/2004 | Houweling | .............. 47/58.1 R |

FOREIGN PATENT DOCUMENTS

| | | |
|---|---|---|
| EP | 0 244 935 | 3/1987 |
| JP | 5-3732 * | 1/1993 |
| NL | 9300559 | 3/1993 |

OTHER PUBLICATIONS

EP Search Report, Application No. 03101397.2-1260, dated Sep. 10, 2003.

* cited by examiner

*Primary Examiner*—David J. Parsley
(74) *Attorney, Agent, or Firm*—Patterson & Sheridan, LLP

(57) ABSTRACT

A system comprising cultivating tables as well as an irrigation device for supplying a liquid medium to cultivation products being cultivated on the cultivating tables, a special feature being the fact that each cultivating table comprises an inlet and an outlet for the medium, with the inlet and/or the outlet comprising a coupling for detachably connecting adjacent cultivating tables.

10 Claims, 5 Drawing Sheets

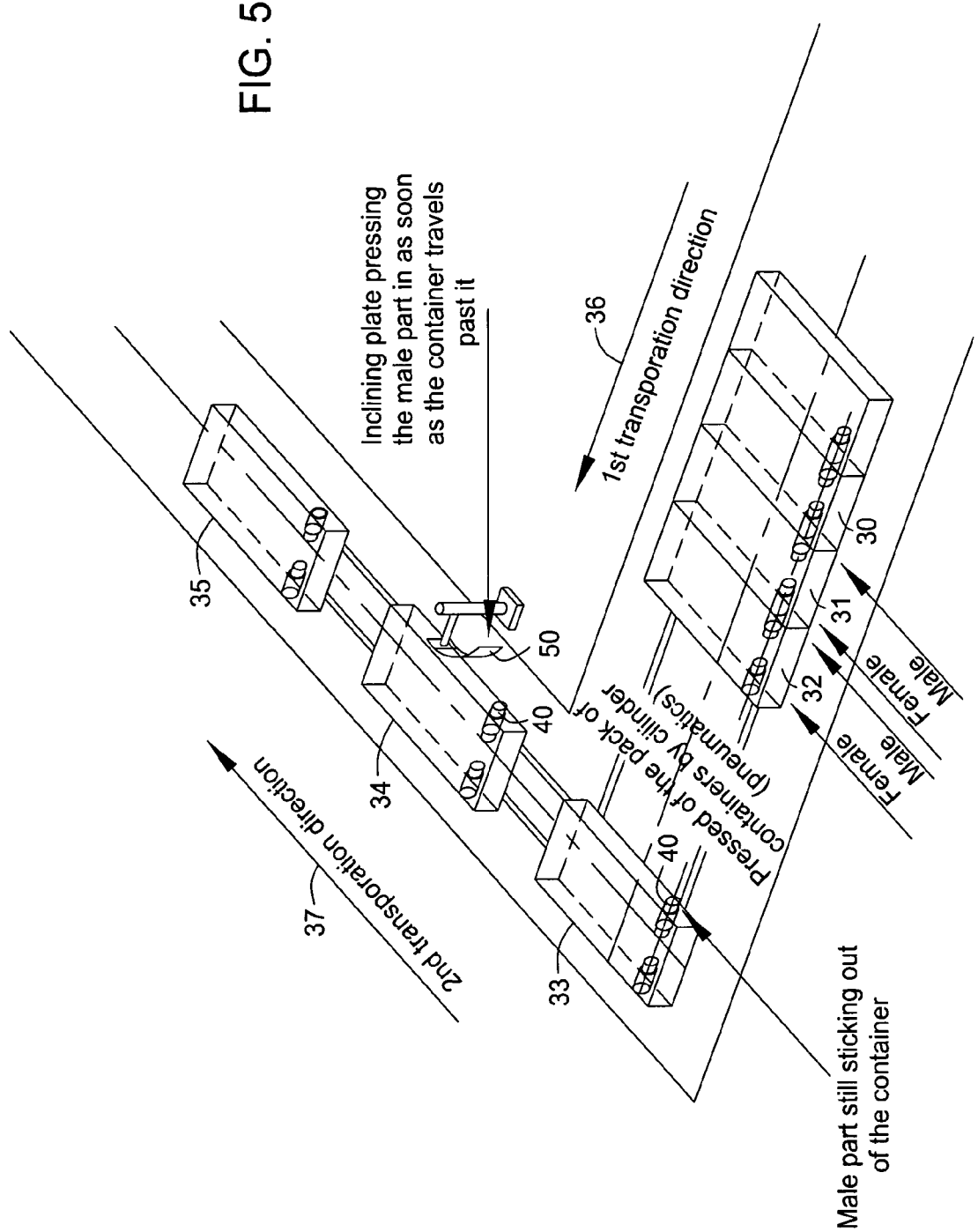

METHOD AND APPARATUS FOR IRRIGATING PRODUCTS ON CULTIVATING TABLES

BACKGROUND OF THE INVENTION

1. Field of the Invention

The invention relates to a system comprising cultivating tables as well as an irrigation device for supplying a liquid medium to cultivation products being cultivated on the cultivating tables. The liquid medium is in particular water, which may or may not contain nutrients for the cultivation products, whilst the cultivation products themselves are usually potted plants or the like. It is noted that the invention is not limited to a specific irrigation method. Thus, the irrigation device may operate according to a so-called ebb-and-flow system, in which the cultivating tables are cyclically inundated to a certain level during a flow period and allowed to run completely dry during an ebb period so as to prevent in particular root rot and fungus occurring at the bottom side of the cultivation products. According to another irrigation method, the water is applied to the cultivation products directly or in drops above the cultivating tables.

2. Description of the Related Art

Such a system operating according to the aforesaid ebb-and-flow system, comprising ten to twenty cultivating tables, for example, is known from U.S. Pat. No. 5,355,618 (Pedersen). In this known system, water is supplied as the irrigation medium in a central inlet pipe under the cultivating tables, in which a magnetically actuated main valve can open the central supply of water during a flow period and shut it off during an ebb period.

One drawback of the system that is known from the aforesaid US patent publication is the following. Nowadays it is usual to position cultivating tables side-by-side (i.e. without aisles) in a greenhouse in order to optimally utilize the space in said greenhouse. The cultivating tables roll on rails installed in the greenhouse in that case. Thus it is possible to move a cultivating table (via an automated system) to an adjoining space, where a manual operation (for example pruning or harvesting) of the cultivation products being cultivated on said cultivating table is to be carried out. Staff present in said adjoining space are thus not exposed to high temperatures and/or polluted air in the greenhouse. The known system is not suitable for this kind of use, since it concern a system of stationary cultivating tables.

SUMMARY OF THE INVENTION

The invention includes coupling elements each comprising a valve which closes on its own accord in the uncoupled position of the coupling elements. Since the valve automatically closes as soon as the coupling elements become detached from each other, i.e. upon detachment of the respective cultivating tables, leakage of the liquid medium is prevented. At least one of the coupling elements is designed in a telescopic manner whereby a portion of the element extends outwards to facilitate a connection between the mating elements. Thereafter, when they are disconnected, the telescopic portion of the element is retractable into a housing to make the element flush with a side of the table and to avoid damage to components during movement of the tables.

BRIEF DESCRIPTION OF THE DRAWINGS

FIG. 5 is a top perspective view of a plurality of cultivating tables illustrating their movement relative to each other.

DETAILED DESCRIPTION OF THE PREFERRED EMBODIMENT

In a preferred embodiment of a system according to the invention, the valve comprises a valve member which is movable between a first position, in which the coupling elements are coupled, and a second position, in which the coupling elements are uncoupled, said valve member opening the valve in said first position and closing the valve in said second position. In particular, the valve member can move from said first position to said second position under the influence of the action of a spring. The valve is a spring-loaded non-return valve in that case, therefore, which provides a seal when the coupling elements are being uncoupled.

In another preferred embodiment of a system according to the invention, the valve members of mating coupling elements push against each other in said first position.

The invention also relates to a cultivating table apparently suitable for use in a system according to the invention.

The invention furthermore relates to coupling elements apparently suitable for use in a system according to the invention.

Figure 1:
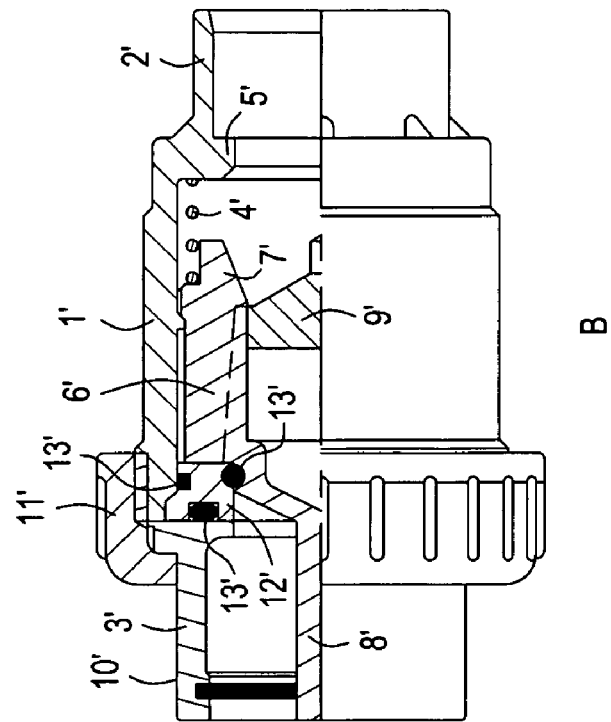
FIG. 1 is a partially longitudinal section of two coupling elements, showing the coupling elements in uncoupled position.
Figure 1:
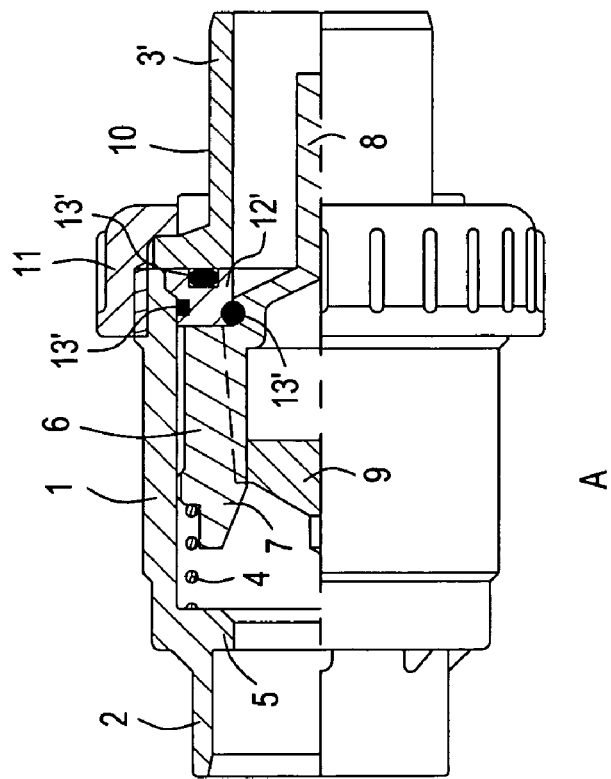
Figure 2:
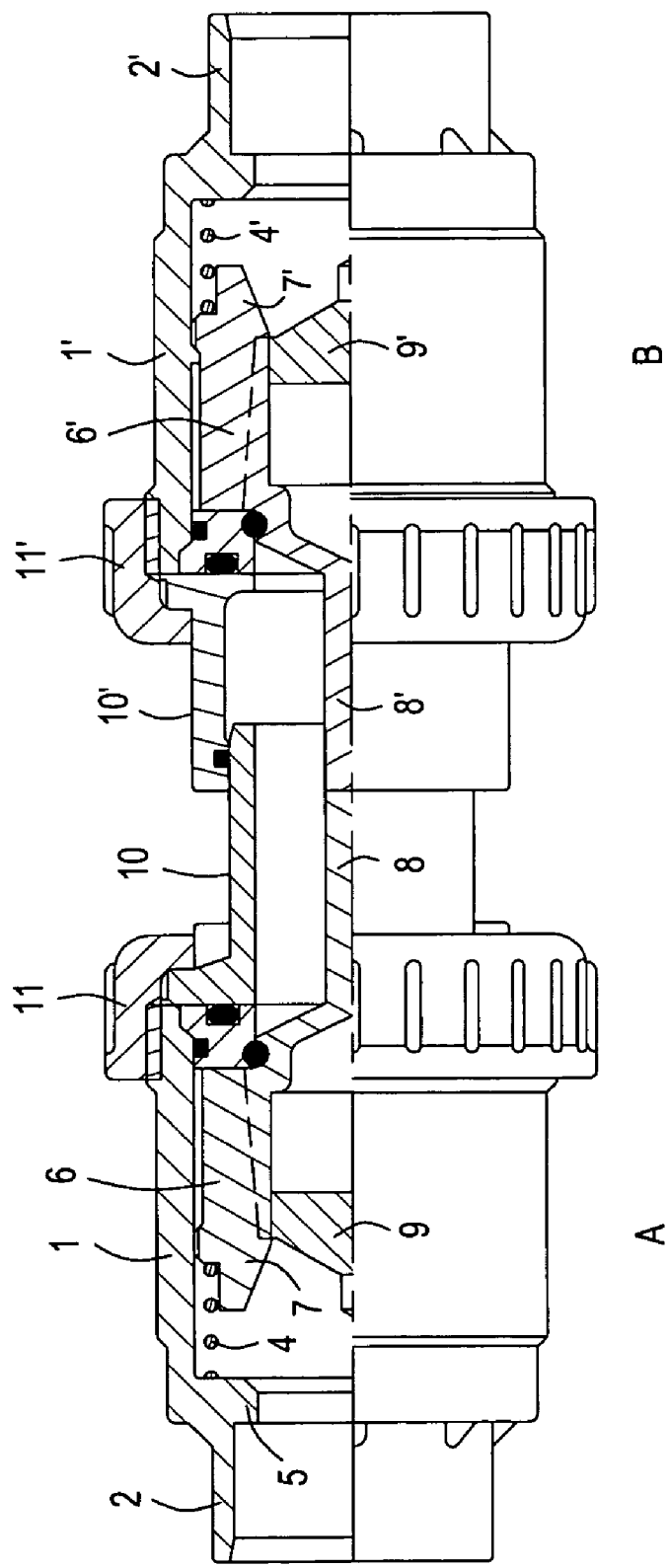
FIG. 2 is a partially longitudinal section of two coupling elements, showing the coupling elements in partially coupled position.
Figure 3:
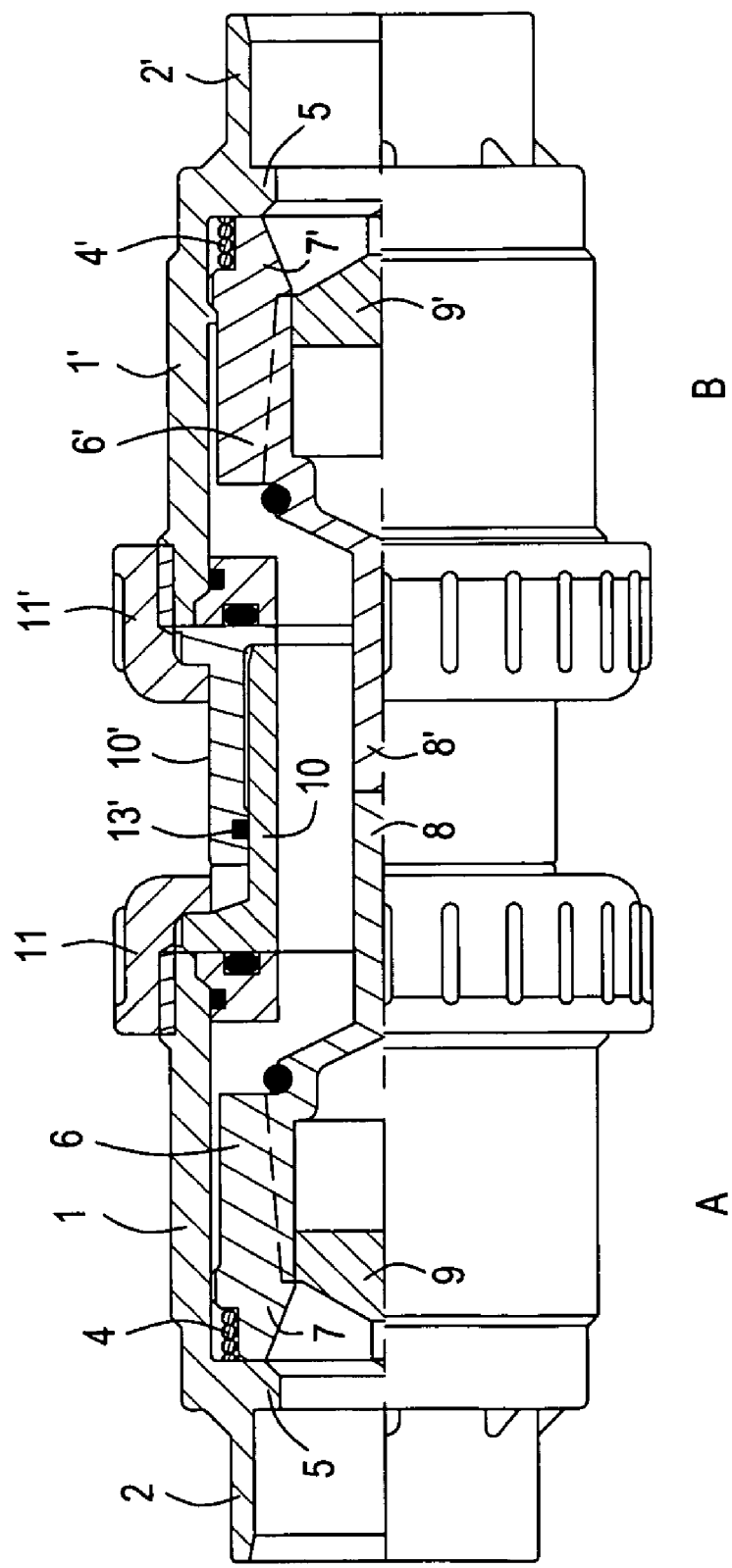
FIG. 3 is a partially longitudinal section of two coupling elements, showing the coupling elements in a coupled position.

The invention will be explained in more detail hereinafter with reference to the Figures:

The Figures show two mating coupling elements A and B, which are each built up as follows. The coupling element A comprises a substantially tubular housing 1, which can be mounted on a water outlet of a cultivating table (not shown) at its one end 2, for example by means of a screwed or a glued joint, and which can be moved into an end 3' of a (likewise substantially tubular) housing 1' of the coupling element B at its other end 3 (FIGS. 2 and 3). An end 2' of the housing 1' disposed opposite the end 3' can be mounted on a water inlet of an adjacent cultivating table (likewise not shown), also by means of a screwed or a glued joint, for example. The two housings 1,1' comprise a steel coil spring 4,4', which is supported on an internal, radially inwardly extending edge 5,5' of the housing 1,1'. The coil spring 4,4' allows movement under spring load of a valve member 6,6' disposed in the housing 1,1' between a first position (in which the coupling elements A and B are coupled; see FIGS. 2 and 3) and a second position (in which the coupling elements A and B are uncoupled; see FIG. 1). In the first position (FIG. 3) the valve member 6,6' opens a valve thus formed, and in the second position (FIG. 1) said valve member automatically closes the valve. Leakage of water during the uncoupling of adjacent cultivating tables, for example when one of said cultivating tables is moved off over rails installed in a greenhouse, for the purpose of manually pruning or harvesting—in a separate space— cultivation products being cultivated on said cultivating table, is impossible, therefore. As the Figures show, the valve member 6,6' is circumferentially provided with legs 7,7', which engage the coil spring 4,4', as well as with pins 8,8'. Said pins 8,8' push against each other in the aforesaid first position (in which the coupling elements A and B are coupled; see FIGS. 2 and 3). A cap 9,9' is present between the legs 7,7' of each valve member 6,6' for reducing the flow resistance of the water.

The end 3,3' of the housing 1,1' is made up of a separate, hat-shaped element 10,10', which is connected to the housing 1,1' by means of a gland nut 11,11' with the interposition of a ring-shaped element 12,12'. The end 2,2' is integrally connected to the housing 1,1'. In order to prevent leakage of water during operation, rubber sealing rings 13,13' are provided. In the illustrated embodiment, the housing 1,1', the valve member 6,6', and the elements 10,10'; 11,11'; 12,12' are made of plastic material.

Figure 4A:
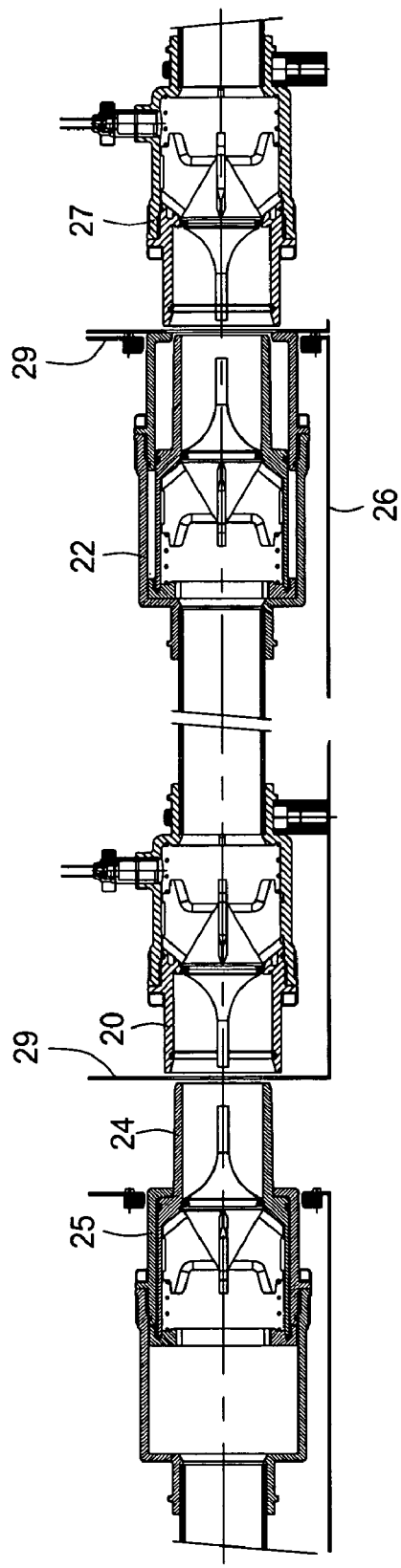
FIG. 4a is a partial section view showing an alternative embodiment of the invention whereby the coupling means operates in a telescopic manner.
Figure 4B:
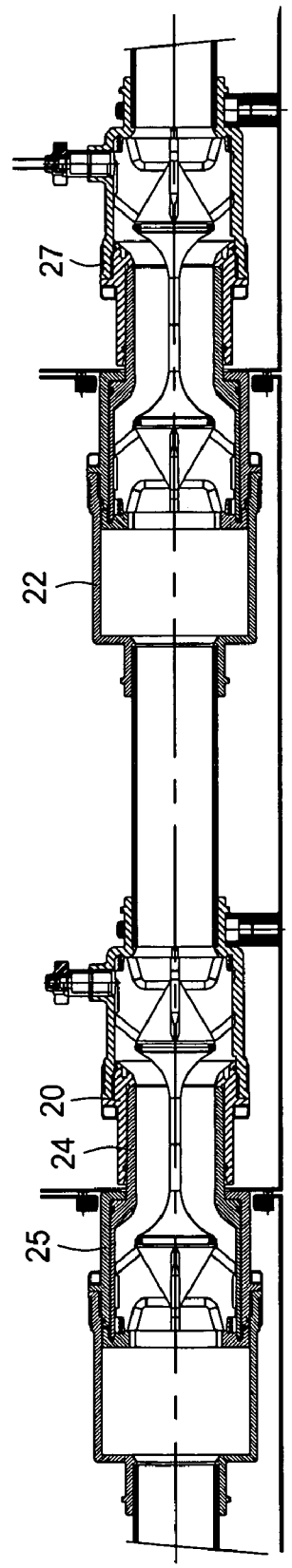
FIG. 4b is a partial section view showing an alternative embodiment of the invention whereby the coupling means operates in a telescopic manner.

FIGS. 4A & 4B illustrate an alternative design of the coupling means that prevents the components from extending outwards to be possibly damaged by other equipment when the table is moved relative to other equipment. The embodiment includes a cylindrical portion of at least one coupling member that is movable outwards from a housing under the influence of water pressure to force a male portion into a female portion of the other member and effect a coupling between the parts. After the water or other fluid has been passed through the apparatus and the parts are disconnected, the cylindrical portion is moveable back into the housing, typically by a stationary member that urges the portion in the direction of the housing as the table moves past the stationary member. Preferably, the retracted cylindrical portion results in the valve assuming a position within a spatial footprint of the table. In this manner the likelihood of damage to the parts is reduced.

FIG. 4A shows a cultivating table 26 having sides 29 with a female coupling member 20 at one side and a male coupling member 22 at an opposite side. In FIG. 4A the male coupling member includes the telescopic cylindrical portion 23. In order to connect the table to adjacent tables, female coupling member 20 receives a telescopic portion of an adjacent male member 25 as shown in FIG. 4B. Likewise, at the other side of the table, the telescopic member 24 of male coupling 22 is extending to facilitate connection with a female coupling 27 on another adjacent table.

FIG. 5 shows the coupling means of the invention in use with a plurality of cultivating tables 30-35. As illustrated, the tables move in a first direction and then a second direction as shown by arrows 36, 37. In the first instance the tables are connected together so that fluid may be passed between them. In the second instance they are disconnected for separate transportation to anther location. For example, in FIG. 5, tables 30, 31, and 32 are coupled together using the coupling means of the invention. Table 33 is shown having been disconnected from table 32. Visible extending thorough wall of table 33 is cylindrical portion that was urged outwards by water pressure as previously described in order to mate with a mating female member of table 32. In the example shown in FIG. 5, the telescopic male member is urged back inwards by a stationary inclined member 50 which is constructed and arranged to intersect the passing table. In another embodiment, the telescopic cylindrical portion could be urged inwards by a spring or other biasing member disposed in its housing.

The invention is not limited to the embodiment as discussed above, but it also extends to other variants that fall within the scope of the appended claims.

The invention claimed is:

1. A method of irrigating products located on adjacent cultivating tables, comprising:
   supplying a coupling system to each table, the coupling system including at least an inlet and an outlet, the inlet and the outlet each having a coupling member and at least one of the coupling members having an extendable and retractable member;
   detachably connecting a first table to a source of pressurized fluid from an adjacent table and to a second adjacent table for disposal of the fluid through the coupling systems of the tables, the connection accomplished by extending the extendable and retractable member of the at least one coupling member past a side wall of one of the tables to mate with the coupling system of another of the tables; and thereafter
   disconnecting the tables from each other for independent movement to another location, while ensuring that no portion of the coupling system for each table extends past a spatial envelope of that table, wherein the spatial envelope is a perimeter defined by sidewalls of each table.

2. The method of claim 1, further comprising moving the first table to a location away from the second table.

3. The method of claim 2, further comprising locating a third table adjacent the second table.

4. The method of claim 3, further comprising connecting the third table to a source of pressurized fluid and coupling the third table to the second table by the pressurized fluid extending the extendable and retractable member beyond the spatial envelope of the third table and into engagement with the coupling member of the second table.

5. The method of claim 4, wherein when the third table and second table are coupled, the extendable and retractable member extends into the spatial envelope of the second table.

6. The method of claim 1, wherein extending the extendable and retractable member is accomplished by applying fluid pressure to the coupling system.

7. A coupling apparatus for use with cultivating tables, the coupling apparatus comprising:
   a male coupling member and a female coupling member adapted to be detachably coupled to each other, the male member mounted adjacent an inside surface of a wall of a first cultivating table, the female coupling member mounted adjacent an inside wall of a second cultivating table wherein when uncoupled both the male and female coupling members are disposed entirely within a spatial envelope defined by the sidewalls of their respective tables; and
   a cylindrical portion within a housing of the male coupling member, the cylindrical portion extendable upon fluid pressure of a liquid adapted to flow through the male coupling member to extend past the spatial envelope of the first cultivating table and into a mating configuration with the female member on the second cultivating table.

8. The coupling apparatus of claim 7, wherein the male and female coupling elements comprise a valve which closes on its own accord in an uncoupled position of the coupling elements.

9. The coupling apparatus of claim 7, further comprising a flow path through the male and female coupling members from the first coupling table to the second cultivating table when the male and female coupling members are in the mating configuration.

10. The coupling apparatus of claim 7, wherein the spatial envelope is a perimeter defined by a plurality of sidewalls of each table.

* * * * *